United States Patent [19]

Belt et al.

[11] Patent Number: 5,303,171
[45] Date of Patent: Apr. 12, 1994

[54] SYSTEM SUSPEND ON LID CLOSE AND SYSTEM RESUME ON LID OPEN

[75] Inventors: Steven L. Belt, Stevensville; Robert J. Grabon, Berrien Springs, Oronoko Township, Berrien County; Chandrakant H. Pandya; Jiming Sun, both of St. Joseph; Neysa K. Terry-Gray, Lake Township, Berrien County, all of Mich.

[73] Assignee: Zenith Data Systems Corporation, Buffalo Grove, Ill.

[21] Appl. No.: 865,048

[22] Filed: Apr. 3, 1992

[51] Int. Cl.$^5$ ............................................. G06F 1/00
[52] U.S. Cl. ................................................. 364/707
[58] Field of Search ............................ 364/707, 708

[56] References Cited

U.S. PATENT DOCUMENTS

| | | | |
|---|---|---|---|
| 4,294,496 | 10/1981 | Murez | 312/208 |
| 4,317,180 | 2/1982 | Lies | 364/707 |
| 4,381,552 | 4/1983 | Nocilini et al. | 364/707 X |
| 4,458,307 | 7/1984 | McAnlis et al. | 364/200 |
| 4,461,003 | 7/1984 | Tamaki | 371/66 |
| 4,506,323 | 3/1985 | Pusic et al. | 364/200 |
| 4,523,295 | 6/1985 | Zato | 364/900 |
| 4,564,751 | 1/1986 | Alley et al. | 364/708 X |
| 4,626,986 | 12/1986 | Mori | 364/200 |
| 4,646,307 | 2/1987 | Nishimura | 371/53 |
| 4,658,352 | 4/1987 | Nagasawa | 364/200 |
| 4,674,089 | 6/1987 | Poret et al. | 364/200 |
| 4,689,761 | 8/1987 | Yurchenco | 364/708 |
| 4,694,393 | 9/1987 | Hirano et al. | 364/200 |
| 4,698,748 | 10/1987 | Juzswik et al. | 364/200 |
| 4,757,505 | 7/1988 | Marrington et al. | 371/66 |
| 4,763,333 | 8/1988 | Byrd | 371/66 |
| 4,782,468 | 11/1988 | Jones et al. | 365/229 |
| 4,823,292 | 4/1989 | Hillion | 364/707 |
| 4,839,837 | 6/1989 | Chang | 364/708 |
| 4,868,832 | 9/1989 | Marrington et al. | 371/66 |
| 4,870,570 | 9/1989 | Satoh et al. | 364/200 |
| 4,907,150 | 3/1990 | Arroyo et al. | 364/200 |
| 4,933,785 | 6/1990 | Morehouse et al. | 360/78.04 |
| 4,945,335 | 7/1990 | Kimura et al. | 364/708 X |
| 4,980,836 | 12/1990 | Carter et al. | 364/483 |
| 4,991,129 | 2/1991 | Swartz | 364/707 |
| 5,021,983 | 6/1991 | Nguyen et al. | 364/707 |
| 5,027,273 | 6/1991 | Letwin | 364/200 |
| 5,027,294 | 6/1991 | Fakruddin et al. | 364/550 |
| 5,068,652 | 11/1991 | Kobayashi | 364/708 X |
| 5,077,551 | 12/1991 | Saitou | 364/708 X |
| 5,129,091 | 7/1992 | Yorimoto et al. | 395/750 |
| 5,142,684 | 8/1992 | Perry et al. | 395/750 |
| 5,155,840 | 10/1992 | Niijima | 395/550 |
| 5,163,153 | 11/1992 | Cole et al. | 364/707 |
| 5,167,024 | 11/1992 | Smith et al. | 395/375 |
| 5,175,845 | 12/1992 | Little | 364/707 |
| 5,175,853 | 12/1992 | Kardach et al. | 395/650 |

FOREIGN PATENT DOCUMENTS 53-22345  3/1978  Japan ................................ 364/707

OTHER PUBLICATIONS

Toshiba T1600 Portable Personal Computer User's Manual, 2nd edition Apr. 1987, pp. 2-1 to 2-3 and 2-8 to 2-11.

Microsoft, MS-DOS, User's Guide, 1986, Title Pages and p. 245.

IBM System/360 Principles of Operation, Eighth Edition (Sep., 1968) Title Pages and pp. 68-83.

Clements, Alan; "Microprocessor Systems Design", 1987, Title pages and pp. 117, 246, 247, 353, 354, PWS--Kent Publishing Company, Boston.

*Primary Examiner*—Long T. Nguyen
*Attorney, Agent, or Firm*—Flynn, Thiel, Boutell & Tanis

[57] ABSTRACT

A portable computer system includes a housing, a lid supported on the housing for movement between open and closed positions, a keyboard supported on the housing below the lid, and a display provided on the lid. When the lid is opened, the keyboard is accessible and the display is visible, whereas when the lid is closed the keyboard and display are hidden and protected. The computer system includes a processor disposed within the housing and having a first operational mode in which it executes instructions and a second operational mode in which it is in a reduced power suspend state from which it can automatically exit in response to a predetermined condition. The system includes an arrangement responsive to closing of the lid when the processor is in its first operational state for switching the processor to its second operational state.

15 Claims, 10 Drawing Sheets

SYSTEM SUSPEND ON LID CLOSE AND SYSTEM RESUME ON LID OPEN

FIELD OF THE INVENTION

This invention relates to a portable computer having a lid movable between open and closed position and, more particularly, relates to the action taken when the lid is moved from the open position to the closed position while the computer system is operating.

BACKGROUND OF THE INVENTION

Portable computers of the type commonly referred to as "laptop" computers and "notebook" computers are becoming very popular They typically include a housing with a lid which is movable between open and closed positions, a display which is mounted on the lid, and a keyboard which is mounted on the housing beneath the lid, the keyboard and display being exposed when the lid is in the open position and being hidden and protected when the lid is in the closed position These systems also include a battery which serves as a source of power. If a user inadvertently closes the lid without remembering to turn off the power, the system can continue to operate and will run down the battery.

One solution to this problem is to provide a lid switch which, in response to movement of the lid to the closed position, shuts off power to the system. However, this can be disadvantageous because, if the user unintentionally bumps the lid and causes it to close, the contents of the volatile semiconductor memory in the computer will be lost, and thus the user may lose important data or program information which he or she did not wish to lose.

An alternative known approach is to respond to the close of the lid by producing an audible beep rather than shutting off power to the system. This permits the user to reopen the lid and continue operation without any loss of data or program information. Nevertheless, if the user does not hear the beep or forgets to open the lid following the beep, the battery may run down and cause the contents of the semiconductor memory to be lost.

A recently-developed microprocessor has the capability to save the status of an operating computer system, then shut off power to almost all of the system, and then enter a low power suspend state, and has the capability to exit the suspend state at a subsequent time, restore power to the system, restore the saved state of the system, and then resume operation from the point at which the system was interrupted. To date, systems using this microprocessor have effected entry to and exit from the suspend mode based on a manually operable push-button switch or on other internal criteria such as expiration of a timer. In these known computer systems, closing of the lid during system operation results only in generation of an audible beep, with the same disadvantages mentioned above.

An object of the invention is therefore to provide an arrangement for causing a system to enter and subsequently exit suspend mode in response to closing and subsequent opening of a lid.

SUMMARY OF THE INVENTION

The objects and purposes of the invention are met according to one form of the invention by providing a computer system which includes a housing, a lid supported on the housing for movement between open and closed positions, a processor provided in the housing and having a first operational mode in which the processor executes instructions and a second operational mode in which the processor is halted in a reduced power state from which the processor can automatically exit in response to a predetermined condition. The system includes an arrangement responsive to movement of the lid to its closed position when the processor is in its first operational mode for switching the processor to its second operational mode.

According to another form of the invention, a computer system includes a housing, a lid supported on the housing for movement between open and closed positions, a processor having a first operational mode in which the processor executes instructions and a second operational mode in which the processor is halted in a reduced power state from which the processor can automatically exit in response to a predetermined condition. This system includes an arrangement for permitting an operator to select one of first and second events to occur when the lid is moved to its closed position, the first event being switching of the processor from the first operational mode to the second operational mode.

BRIEF DESCRIPTION OF THE DRAWINGS

A preferred embodiment of the present invention is described in detail hereinafter with reference to the accompanying drawings, in which.

DETAILED DESCRIPTION

Figure 1A:
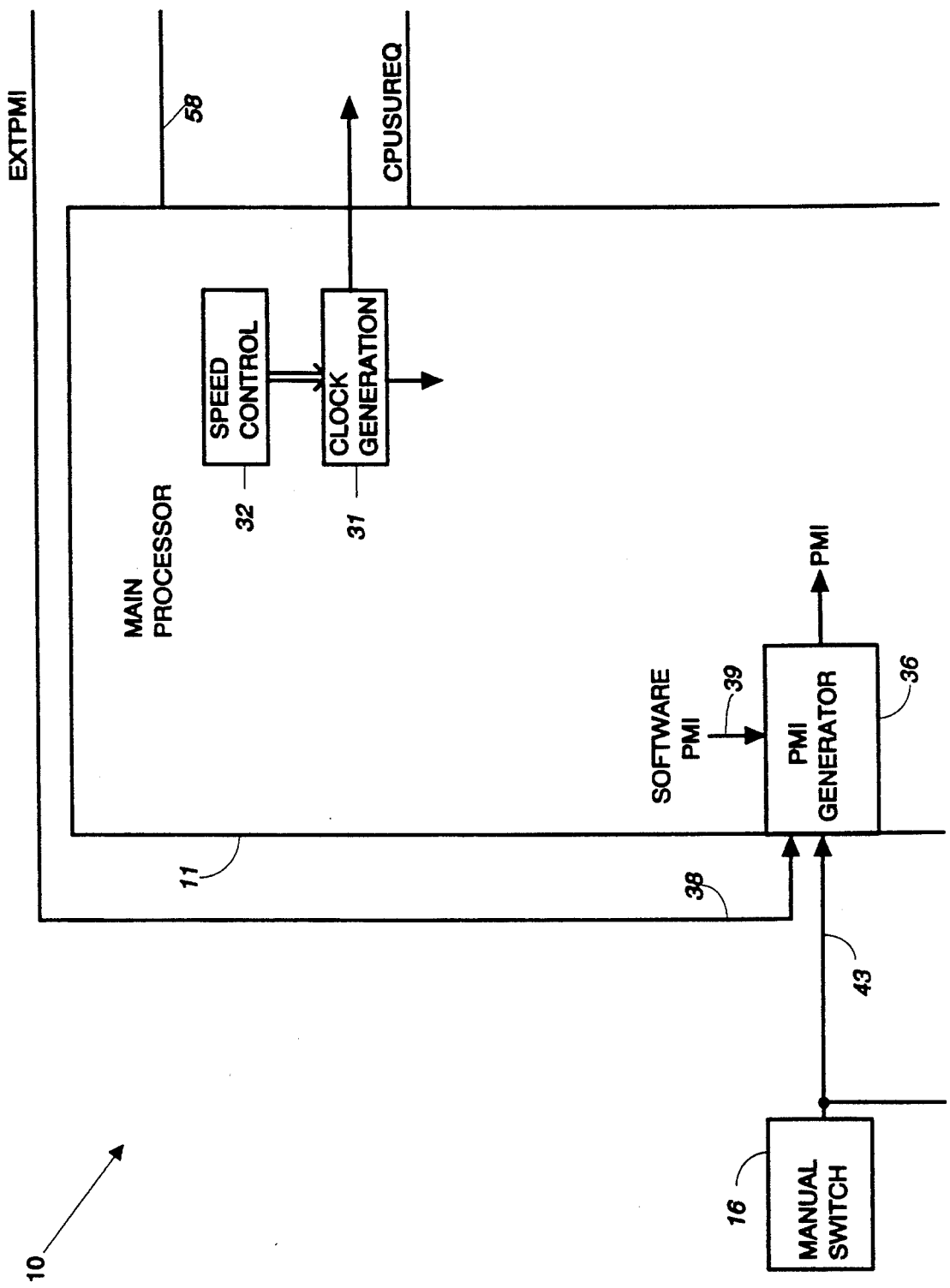
FIGS. 1a, 1b, 1c and 1d, which are collectively referred to herein as FIG. 1, show a block diagram of a computer system embodying the present invention.
Figure 1B:
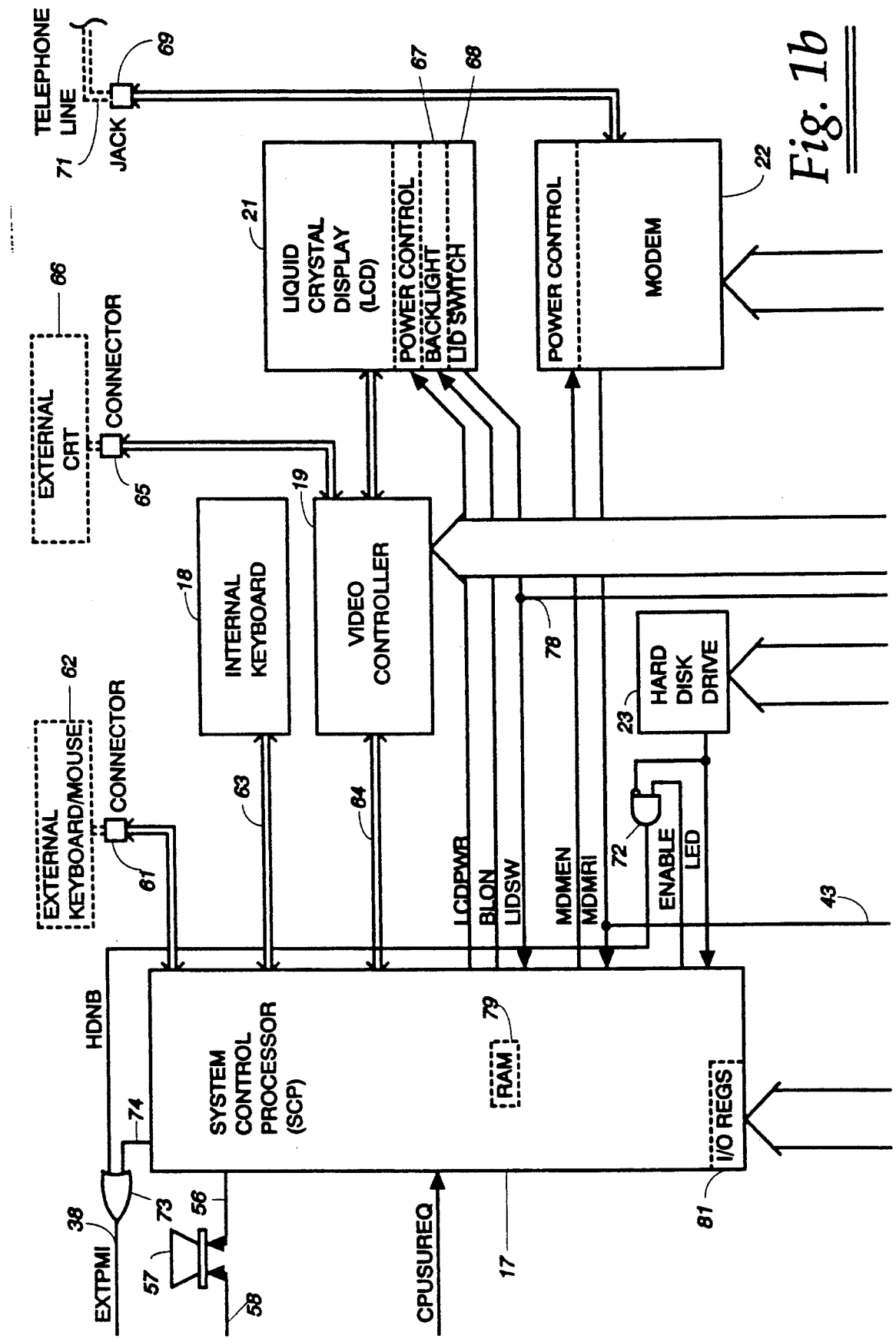
Figure 1C:
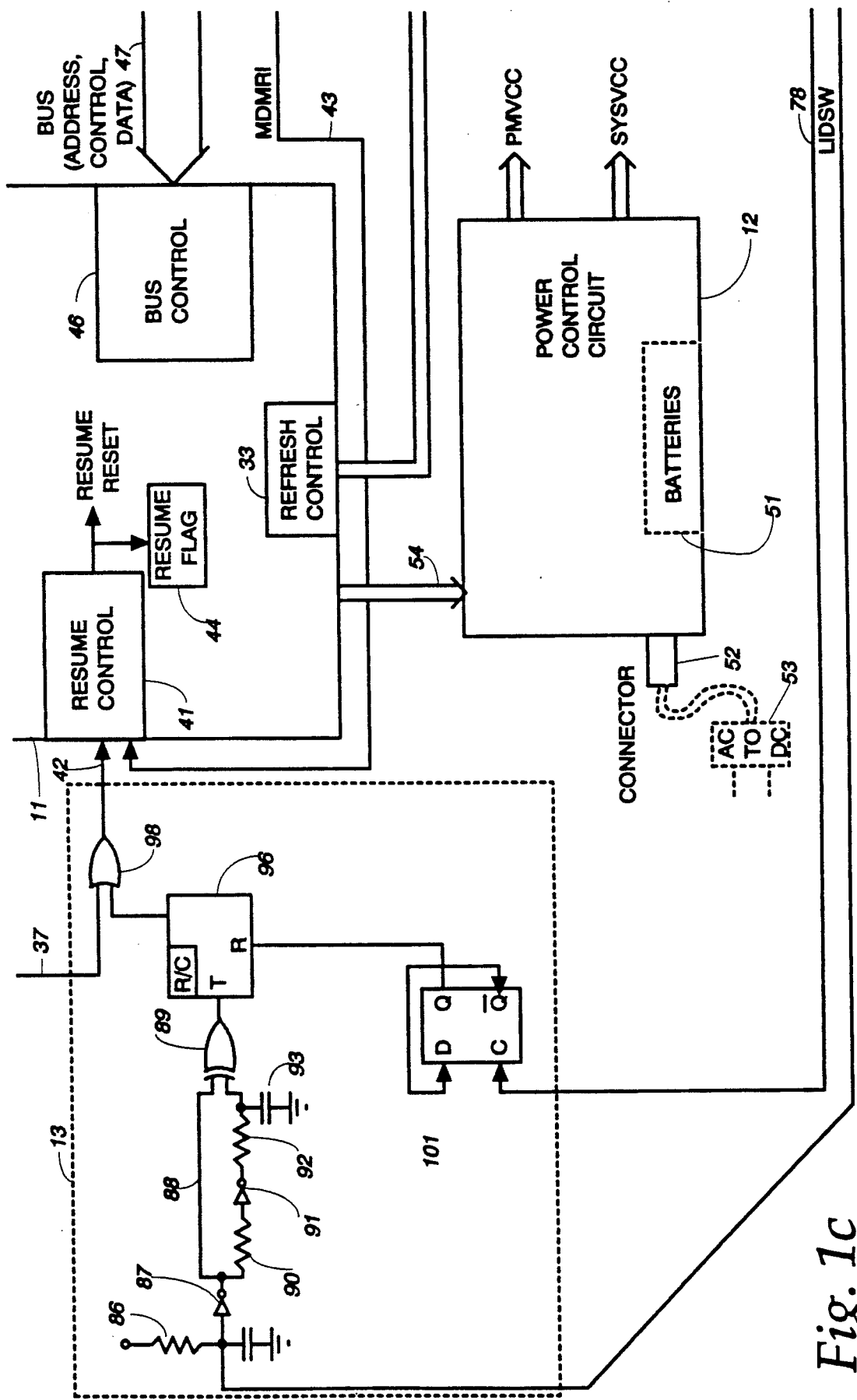
Figure 1D:
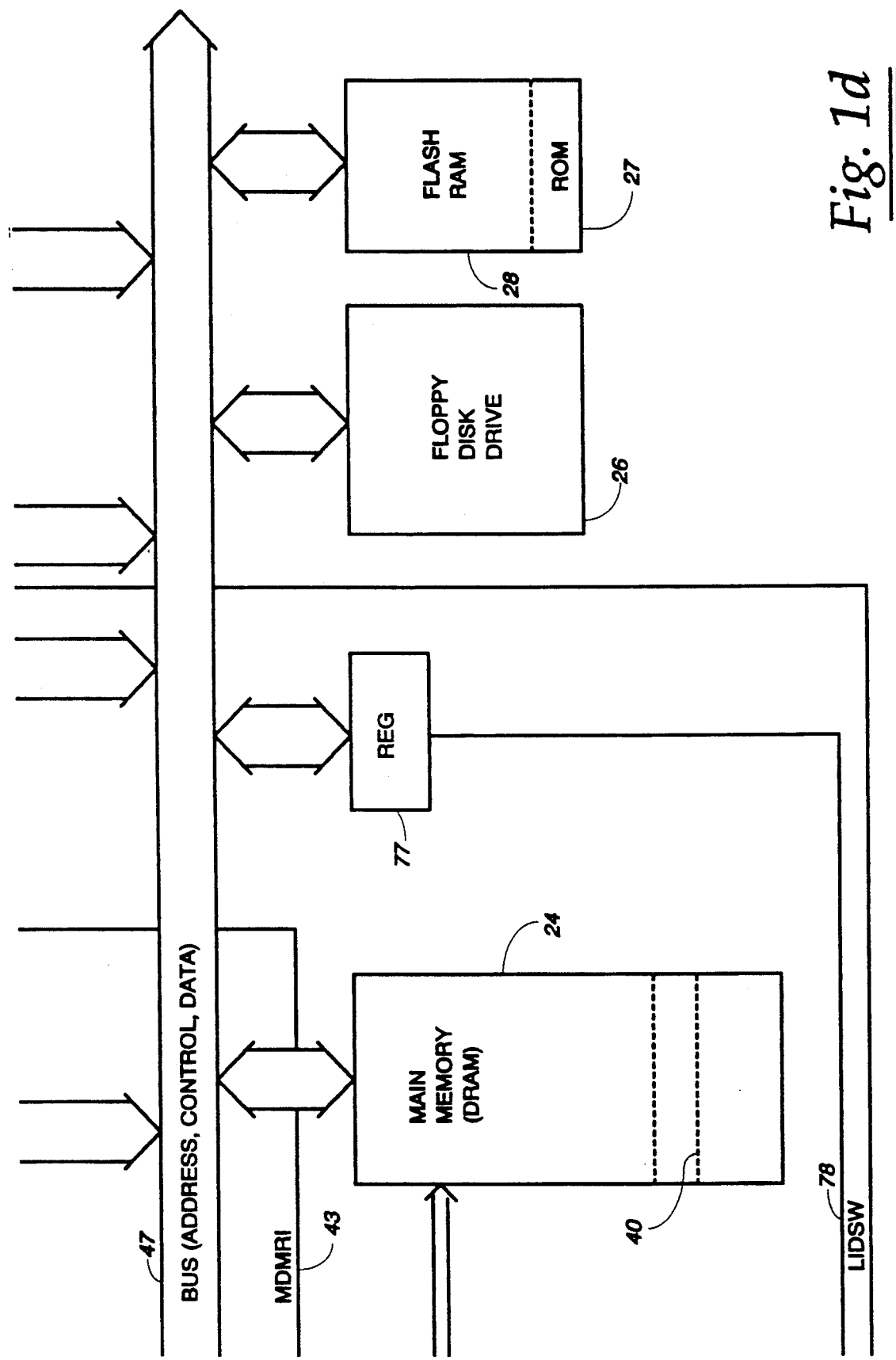

FIGS. 1a, 1b, 1c and 1d, which are collectively referred to herein as FIG. 1, show is a block diagram of a "notebook" type laptop computer system 10 which embodies features of the present invention. The computer system 10 includes a main processor 11, a power control circuit 12, a signal processing circuit 13, a manually operable power control switch 16, a system control processor (SCP) 17, an internal keyboard 18, a video controller 19, a monochrome liquid crystal display (LCD) 21, a modem 22, a hard disk drive 23, a main memory 24 implemented with dynamic random access memory (DRAM) chips, a floppy disk drive 26, a read only memory (ROM) 27, and a flash RAM 28.

In the preferred embodiment, the main processor 11 is implemented with an Intel 386SL, which is a conventional component commercially available from Intel Corporation of Santa Clara, Calif. This microprocessor has certain special features which are described in U.S. Ser. No. 07/752 342 filed Aug. 30, 1991, which is a continuation-in-part of U.S. Ser. No. 07/705 039 filed May 17, 1991. The disclosures of each of these prior applications are hereby incorporated herein by reference. Detailed information regarding the Intel 386SL is also available directly from Intel, and the entire internal architecture thereof is therefore not shown and described in detail here. Those features of the processor which are pertinent to the present invention are briefly described here.

More specifically, the main processor 11 includes a clock generator 31 which generates respective clocks for various components of the system, including the processor 11 itself, and which is controlled by a speed control register 32. The processor 11 and some other system components are of a type which use more power when running at a higher clock speed than when running at a lower clock speed. Therefore, clocks can be set to a higher speed when rapid processing is required despite the fact that a larger amount of power is drawn from the system battery during a given time period, whereas when processing speed is not critical a lower clock speed can be used in order to reduce the amount of power being drawn from the battery.

A refresh control circuit 33 controls the rate at which the data stored in the main memory 24 is refreshed. The slower the refresh rate, the lower the power consumption by the main memory 24. The refresh rate can be set to a very low rate in which the memory 24 uses minimal power, but at this low rate it is not possible to read or write data to or from the memory 24.

The processor 11 also includes a power management interrupt (PMI) generator 36, which generates a special PMI interrupt in response to several conditions, three of which are shown in FIG. 1. The first is the occurrence of a signal on a line 37 in response to manual actuation of the manual switch 16, the second is a signal EXT PMI on a line 38 from an external source, and the third is an interrupt which is internally generated by software running in the processor 11 and which is indicated diagrammatically at 39.

When the PMI interrupt occurs as a result of any of these conditions, the hardware in the processor 11 automatically saves the current internal state of the processor 11 in a special portion 40 of the memory 24. Then, the processor automatically begins execution of a special interrupt routine, which is described later. Upon completion of the interrupt routine, a restore instruction automatically restores the state of the processor 11 from the portion 40 of the memory 24, and causes the processor 11 to resume operation from the point at which it was interrupted.

The processor 11 has several conventional modes of operation, one of which is an "unprotected" mode in which the program running in the processor 11 has access to all operational capabilities of the processor 11, whereas the other modes are "protected" modes in which the program running in the processor 11 has different degrees of accessibility to the operational capabilities. The occurrence of a PMI interrupt automatically forces the processor into the unprotected mode of operation, while the restore instruction will restore the processor to the mode of operation which it was in at the time the PMI interrupt occurred. Consequently, an application program which is running in one of the protected modes can be interrupted, the processor can carry out various functions in the unprotected mode without any of the limitations which would be present in one of the protected modes, and then the application program can be resumed from the point at which it was interrupted with its own protected mode back in effect.

When an application program has been interrupted, the processor 11 has the capability to enter a suspend or rest mode, in which it causes the power control circuit 12 to shut off power to most other components in the system, and then turns off its own clock in order to enter a very low power mode. The system can be in the suspend mode for a very short period of time, or for several weeks (if the batteries are fully charged when suspend is entered). When a resume event occurs, the processor turns its clock back on, causes the power control circuit 12 to restore power to other components, and then returns to the interrupted application program.

A resume control circuit 41 is responsible for causing the processor 11 to resume from the suspend mode. The resume control circuit 41 is responsive to several conditions, two of which are shown in FIG. 1. The first is an output signal on line 42 from the signal processing circuit 13, which is described in more detail later. The other is a modem ring indicator signal MDMRI on a line 43 from the modem 22. When the system is in the suspend mode and a signal occurs on one of the lines 42 and 43, the resume control circuit 41 produces a resume reset which internally resets the main processor 11 and which also sets a resume flag 44. The resume flag 44 remains set in order to provide an indication to the software that the reset was the result of a resume event and not a standard system reset of the type which occurs when power is first applied to the system. The reset causes the processor to begin executing a special software routine in the flash RAM 28, as described in more detail later.

The processer 11 also includes a bus control circuit 46 to control a bus 47, which includes address, control and data lines, and which couples the processor 11 to other major system components.

The power control circuit 12 includes batteries 51, and has a connector 52 to which can be attached an AC to DC converter 53. The power control circuit 12 has a power output PMVCC on which it supplies power to the processor 11, main memory 24 and signal processing circuit 13, and has a power output SYSVCC on which it supplies power to other system components. The power control circuit 12 is controlled at 54 by the main processor 11.

Turning to the System Control Processor 17, the SCP in the preferred embodiment is based on an Intel 87C51GB microprocessor, but it will be recognized that there are other commercially available microprocessors which could also be used for the SCP. The SCP can generate a speaker control signal on a line 56 which is connected to a speaker 57, which can cause the speaker 57 to produce an audible beep. The speaker 57 can respond in a similar manner to a signal produced by the main processor 11 on a line 58. The SCP receives from the main processor 11 a signal CPUSUREQ, which the main processor actuates just before it sends a command to the SCP.

The SCP 17 includes a RAM 79 in which the SCP can store and retrieve information during system operation. The SCP also includes several input/output (I/O) registers 81, which are used to pass data between the main processor 11 and the SCP 17.

The SCP 17 is coupled to an external connector 61, to which can optionally be coupled a conventional mouse or external keyboard 62. The SCP is also coupled at 63 to the internal keyboard 18, and is coupled at 64 to the video controller 19. The video controller 19 is coupled to a connector 65, to which can optionally be coupled a conventional external CRT display 66. The video controller 19 is also coupled to the LCD 21.

The SCP sends to the LCD 21 a signal LCDPWR, which turns on and off the power to the liquid crystal display in the unit 321. The display includes a backlight 67 which illuminates the liquid crystal display. The display unit is provided on a lid of the laptop computer which, in a conventional manner, can be moved between positions covering and exposing the keys of the internal keyboard 18, the liquid crystal display 21 being visible and hidden when the lid is respectively in the open and closed positions. The SCP 17 generates a signal BLON which turns on and off the backlight 67. A lid switch 68 is provided to indicate whether the lid is open or closed, and sends an appropriate signal on a line LIDSW to the SCP 17.

The SCP 17 also generates a signal MDMEN which causes the power control section of the modem 22 to selectively provide power to the modem or to shut off power to the modem (or at least place the modem in a low power consumption state). The SCP 17 receives from the modem 322 the previously-mentioned modem ring indicator signal MDMRI, which is actuated when an incoming telephone call reaches the modem through a telephone jack 69 to which the modem is coupled, the jack 69 being adapted to be optionally coupled to a standard telephone line 71.

The hard disk drive 23 produces an output signal LED which is used in a conventional manner to control a conventional and not-illustrated light emitting diode in order to provide the computer user with a visual indication of the activity of the hard disk drive. This LED signal is connected to the SCP and to one input of a two-input AND gate 72, the hard disk not busy output HDNB of which is connected to one input of a two-input OR gate 73 and indicates that the hard disk is not busy. The other input of the AND gate 72 is connected to an ENABLE output signal of the SCP 17, and thus the SCP can selectively enable and disable the gate 72. The SCP also produces an output signal at 74 which is connected to a second input of the OR gate 73, the output of the OR gate 73 being the previously-mentioned EXT PMI signal to the main processor 11.

A register 77 is coupled to the bus 47 and produces an output on a line 78 which is coupled to an input of the signal processing circuit 13 and which is discussed in more detail later.

The flash RAM 28 is a conventional semiconductor device which can be electrically modified, but is not volatile and will retain the information stored in it when power to it is turned off. The flash RAM contains the basic input/output system (BIOS) program. The ROM 27 contains a program which is normally not used, but which can be used to control the system while the flash RAM 28 is reloaded in the event an unusual circumstance causes the contents of the flash RAM to be lost.

The floppy disk drive 26 is conventional in all respects, and not described in detail.

The signal processing circuit 13 includes an R/C divider 86 tied to the LIDSW output from the lid switch 68, and an inverter 87 which has an input connected to the signal LIDSW. The output 88 of the inverter is connected to one input of a two-input exclusive-OR gate 89, and through a resistor 90 to an input of a further inverter 91. The output of inverter 91 is coupled through a resistor 92 to the other input of the gate 89, which is coupled to ground by a capacitor 93. The output of the gate 89 is connected to the trigger input of a monostable multivibrator or "one-shot" 96, the time period of which is controlled by an R/C network 97. When the lid switch 68 closes or opens, the change in the state of its output signal LIDSW is applied through inverter 87 on line 88 to one input of the gate 89, causing the output of gate 89 to change, and a short period of time later is applied through resistor 90, inverter 91 and resistor 92 to the other input of the gate 89, causing the output of the gate 89 to return to its original state. Thus, every time the lid switch 68 opens or closes, the exclusive OR gate 89 will produce a pulse equal in length to the propogation delay through the circuit branch containing resistor 90, inverter 91, resistor 92 and capacitor 93. This pulse will trigger the one-shot 96, so that it produces an output which is applied to one input of an OR gate 98, the other input of which is coupled to the output 37 from the manual switch 16. The output of the OR gate 98 is the line 42, which is connected to the resume control portion 41 of the main processor 11.

The signal processing circuit 13 also includes a D-type flip-flop 101 having a clock input to which is coupled the line 78 from the register 77. The inverted output of the flip-flop is connected to the D input, so that the flip-flop changes state or "toggles" each time the signal on line 78 changes from a logic low to a logic high. The output of the flip-flop 101 is connected to a reset input of the one-shot 96. Consequently, by appropriately controlling the register 77, the main processor 11 can set or reset the flip-flop 101, so that it enables or disables the one-shot 96 and thus permits or prevents the one-shot 96 from producing an output in response to a pulse from the gate 89.

Figure 2:
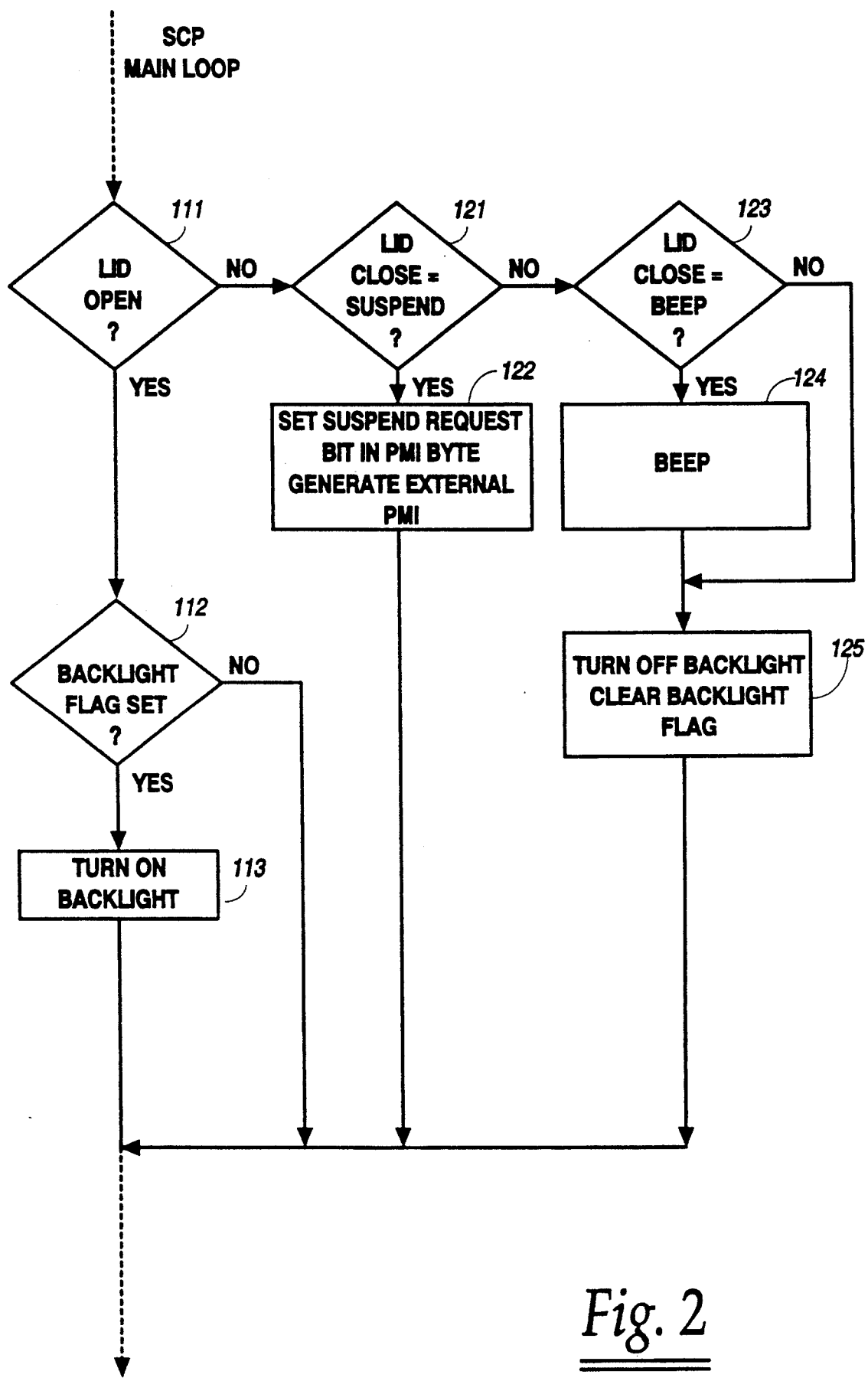
FIGS. 2 and 3 are flowcharts of selected program segments executed by an auxiliary processor of the system of FIG. 1.

FIG. 2 is a flowchart of a portion of a main loop from the operational program executed by the SCP 17. Only the portion of the loop which is pertinent to an understanding of the present invention is shown and described in detail. In particular, this portion begins at block 111, where the SCP checks the LIDSW signal (FIG. 1) in order to determine the state of the lid switch 68 and thus whether the lid is open. If the lid is open, then at block 112 the SCP checks an internal flag to determine whether the backlight is presently supposed to be on, and if so then the SCP turns on the backlight at block 113 and then continues with the main loop. On the other hand, if it is determined at block 112 that the backlight is not supposed to be on, then block 113 is skipped and the main loop continues.

If it was determined at block 111 that the lid is closed, then control proceeds to block 121, where a check is made to determine what is to happen when the lid is closed. In particular, the user is allowed to configure the system set-up information to specify that a lid close is to (1) place the system in the suspend mode, (2) turn off the backlight without stopping the system from operating, or (3) produce an audible beep and turn off the backlight without stopping system operation. If it is determined at block 121 that the user wants the system to enter the suspend mode if the lid is closed, the control proceeds to block 122, where the SCP sets a suspend request bit in a PMI byte. The PMI byte is a byte (8 bits) which is sent on request to the main processor in order to inform the main processor of the reason why the SCP generated a PMI interrupt. Then, also in block 122, the SCP produces a signal on output line 74 (FIG. 1) in order to produce an external PMI to the main processor, which is handled in a manner described later. Alternatively, instead of producing the external PMI interrupt in block 122, the SCP could set a flag in block 122 which causes an entirely different portion of the SCP program to actually generate the PMI interrupt upon noting that the flag has been set.

If it is determined in block 121 that a lid close is not to cause the system to be placed in suspend mode, then control proceeds to block 123, where a check is made to see if an audible beep is to be produced when the lid is closed. If so, then the beep is produced at block 124. In either case, control proceeds to block 125, where the SCP turns off the backlight and clear the backlight flag. From blocks 122 and 125, execution of the main loop continues.

Figure 3:
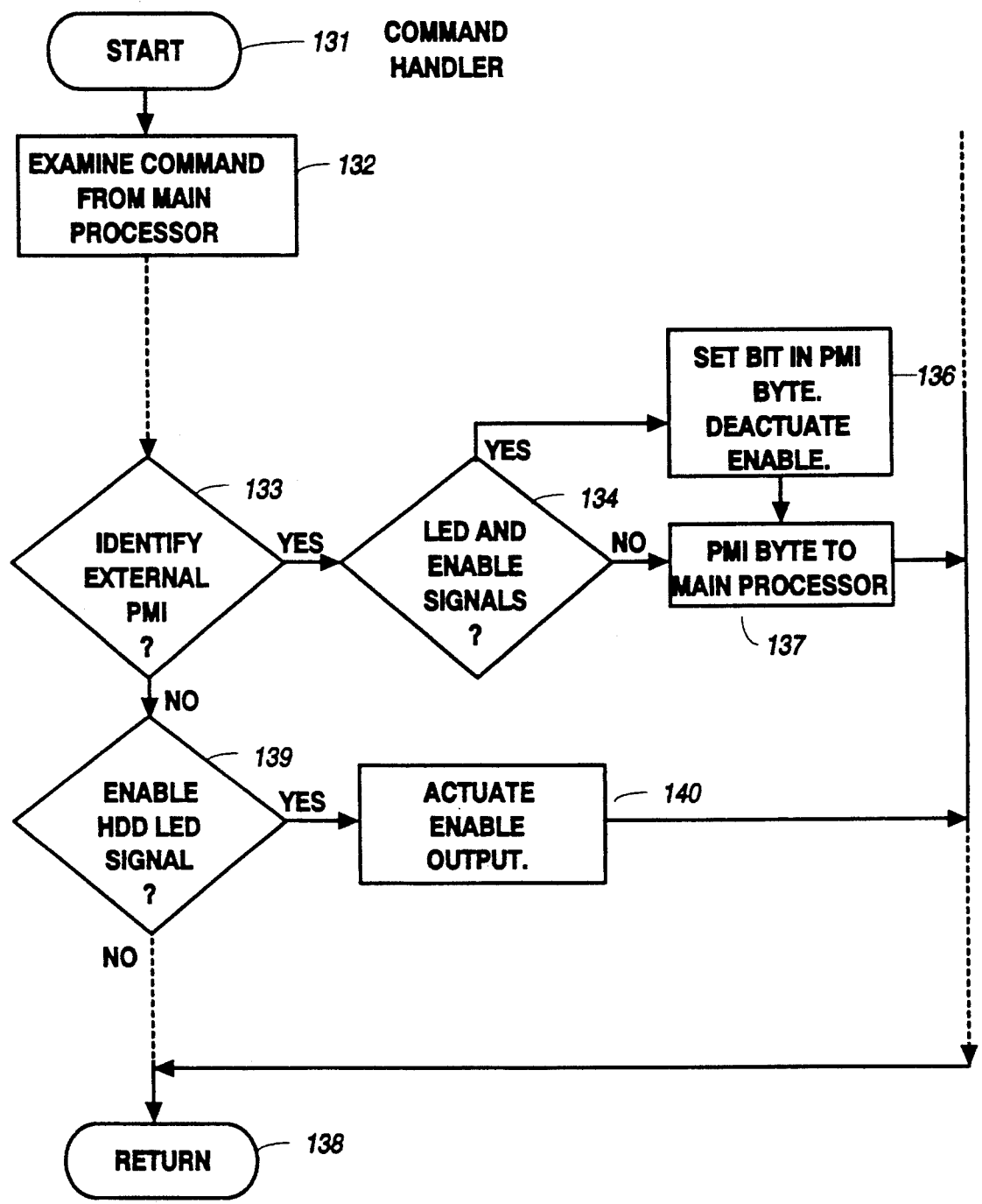

An event which can interrupt the SCP from the main routine shown in FIG. 2 occurs when the main processor sends a command to the SCP. The loading of this command into an SCP interface register 81 by the main processor automatically generates an interrupt to the SCP. The interrupt routine which handles the commands is shown in the flowchart of FIG. 3. The command handler of FIG. 3 is capable of handling a number of commands, only two of which are pertinent to the present invention and are depicted in FIG. 3. In particular, execution begins at block 131, and at 132 the SCP examines the command from the main processor. The SCP then attempts to identify the particular command so that it can be handled. In particular, control can eventually proceed to block 133, where the SCP checks to see if the command is instructing it to identify why the SCP generated an external PMI interrupt to the main processor. If this is the command sent by the main processor, then control proceeds to block 134, where the SCP checks to see whether its ENABLE output is active and the LED signal from the hard drive 23 is simultaneous inactive, and if so proceeds to block 136, where it sets a bit in the PMI byte to identify this condition and then deactuates its ENABLE output. Then, or if it was determined at block 134 that the signals do not have the specified states, control proceeds to block 137, where the SCP passes the PMI byte to the main processor 11 through the registers 81. Control then proceeds to block 138, where the SCP exits the interrupt handler of FIG. 3 and returns to the point in its main program at which it was interrupted.

If it was determined at block 133 that the command is not a request to identify the source of an external PMI, then control proceeds to block 139 where the SCP checks to see if the command is instructing it to enable the hard disk drive LED signal, or in other words to actuate its ENABLE output. If so, the SCP proceeds to block 140, where it actuates its ENABLE output, and then continues to block 138, where a return is made to the calling routine.

Figure 4:
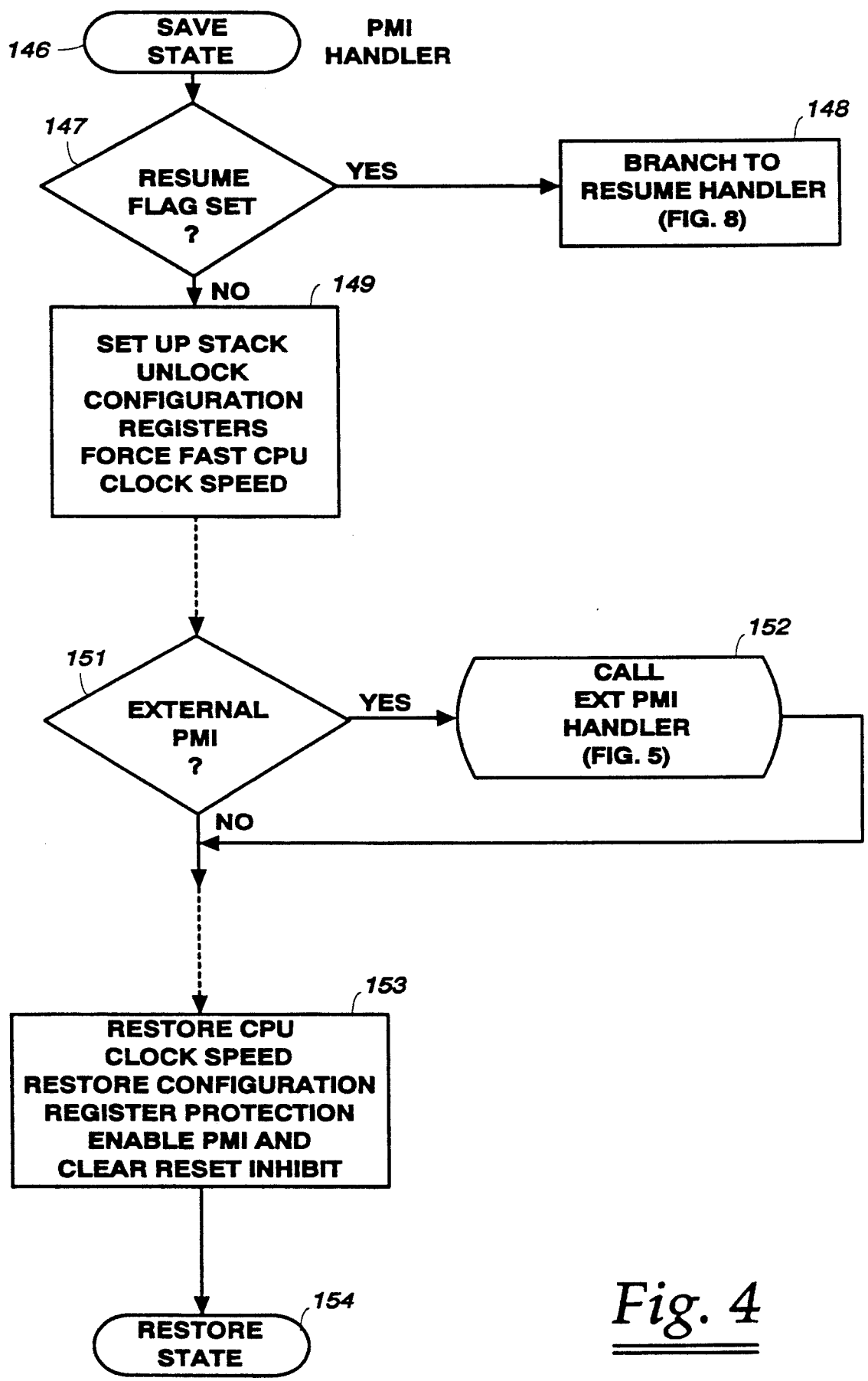
FIGS. 4–8 are flowcharts of selected program segments executed by a main processor of the system of FIG. 1.

FIG. 4 is a flowchart of pertinent portions of the special interrupt handling routine executed by the main processor 11 when a PMI interrupt occurs. In particular, a PMI from any source causes the hardware of the processor 311 to automatically save its state in the portion 40 of the main memory 24, as shown at 146 in FIG. 4. Then, the processor automatically begins execution of the PMI handler routine (which is located at a predetermined point in the portion 40 of the memory 24). Regardless of the source of the PMI, the first thing the PMI handler does is to check the resume flag 44 (FIG. 1) in the processor 11 in order to see whether the processor 11 is in the process of resuming from a suspend state. If a resume is in progress, then at block 148 control is transferred to a resume handler, which will be discussed later.

Figure 5:
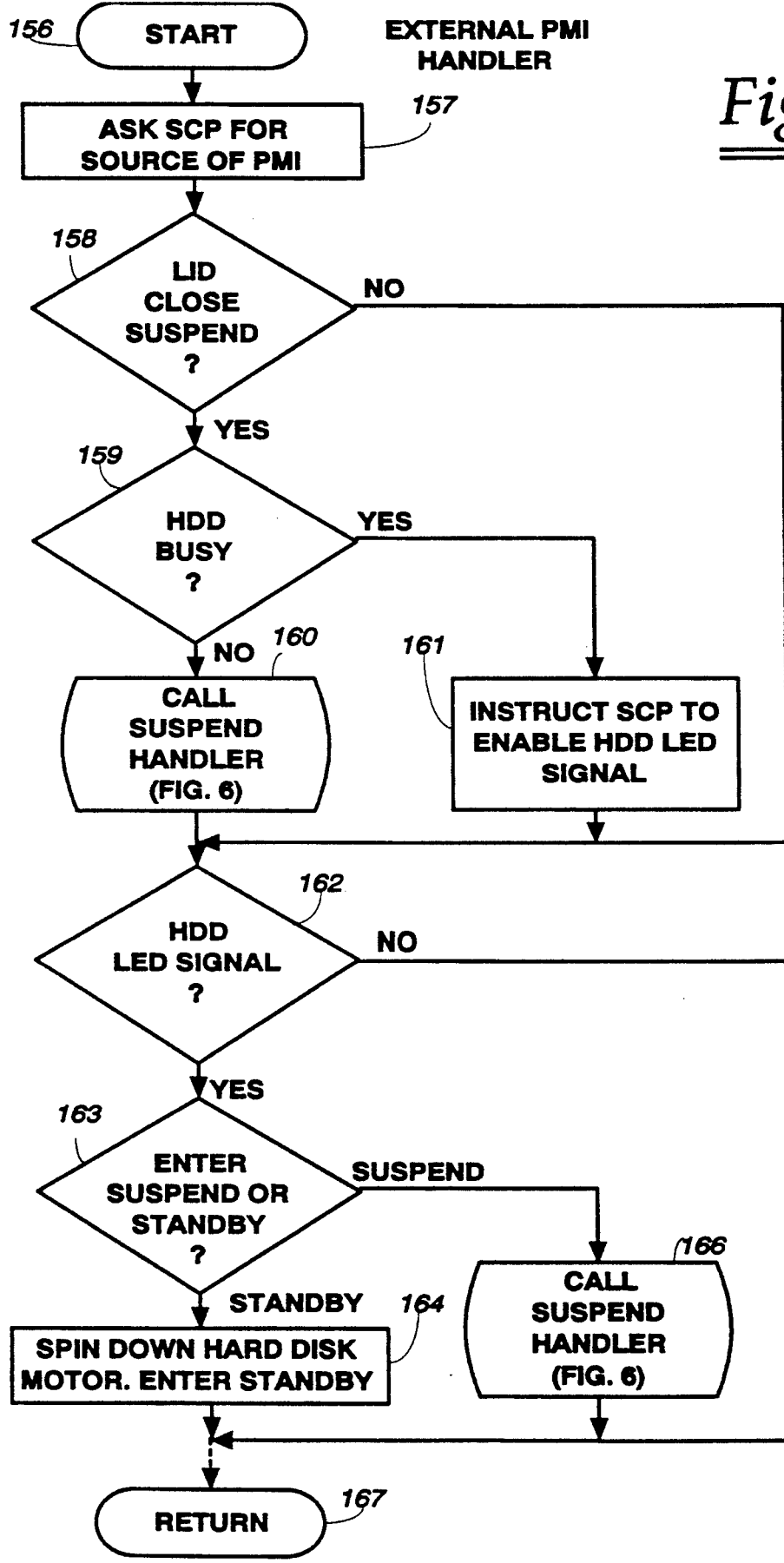

In the case of any other PMI, control proceeds to block 149, where the processor sets up a special stack for use by the PMI handler, and unlocks configuration registers so that they can be altered, such as the control register 32 which can be used to change the speed of the clock. Then, the processor changes the register 32 in order to force the CPU to run at its fastest clock speed, so that the PMI routine will execute as fast as possible. The processor then proceeds to deal with various possible sources of the PMI, one of which is of interest and is shown at blocks 151 and 152. In particular, block 151 checks to see if the PMI was generated as a result of a signal on the line 38 from the SCP, and if so proceeds to block 152, where an external PMI handler routine is shown in FIG. 5 and is called. The external PMI handler routine will be described later.

After all possible sources of the PMI have been handled, control reaches block 153, where the main processor restores to register 32 the clock speed which was in effect when the PMI occurred, based on the information saved at block 146. Then, the main processor locks the configuration registers, enables PMI interrupts, and clears an internal condition which prevents a reset from occurring during execution of the PMI handler routine. Then, at 154, the processor executes a restore instruction which causes the hardware to restore to the CPU all of the state information which at block 146 was saved in memory portion 40, after which the CPU continues with execution of the program which was interrupted.

FIG. 5 is a flowchart of the external PMI handler routine called by block 152 in FIG. 4. In FIG. 5, execution begins at block 156, and at block 157 the main processor sends a command to the SCP asking it to identify the reason for the external PMI interrupt. The SCP returns the PMI byte (see blocks 133-134 and 136-137 in FIG. 3). At block 158, the main processor checks the PMI byte to see if the SCP has initiated a request for suspend mode in response to closing of the lid. If so, then at block 159 the main processor checks to see if the hard disk drive is busy. If it is not, then at block 160 the main processor calls the suspend handler routine, which is described later. If the hard disk drive is busy, however, then implementation of the suspend mode must wait until the hard disk drive finishes whatever it is doing. The main processor therefore proceeds from block 159 to block 161, where it sends a command to the SCP which instructs the SCP to actuate its ENABLE output (see blocks 139-140 in FIG. 3). From blocks 160 and 161, execution proceeds to block 162. Execution can also proceed directly to block 162 from block 158 if it is determined at block 158 that the external PMI interrupt was not caused by closing of the lid.

At block 162, the main processor checks the PMI byte from the SCP to see if the LED signal from the hard disk drive 23 produced the PMI interrupt through the gates 72 and 73. If so, then at block 163 the main processor checks to see whether it has been waiting for the hard disk drive to finish an operation so that it can enter suspend mode or so that it can enter another mode which is called standby and which is not pertinent to the subject matter of the present invention. If the system is to enter standby mode, then at block 164 the processor turns off the hard disk drive motor, and enters the standby mode. Otherwise, at block 166, the processor calls the suspend handler in order to enter the suspend mode. In either case, when the standby or suspend mode is eventually terminated, control proceeds to block 167, where a return is made to the routine of FIG. 4.

Figure 6:
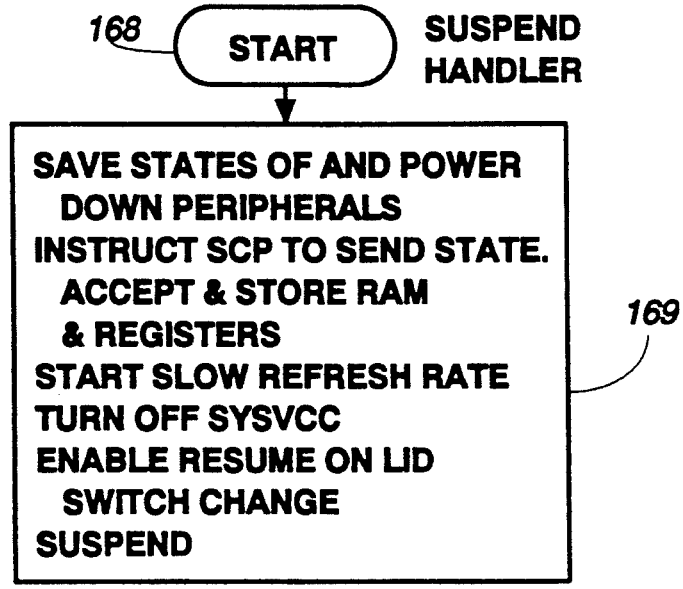

FIG. 6 is a flowchart of the suspend handler routine. Execution begins at block 168, and at block 169 the main processor saves the states of various peripherals such as the hard disk drive 23 and video controller 19.

The main processor also turns off power to certain peripherals. Then, the main processor sends a command to the SCP which instructs it to send its state to the main processor, and the main processor accepts and stores the contents of the RAM 79 and all registers of the SCP. Then, the main processor sets the refresh control circuit 33 to carry out a refresh of the main memory 24 at a very slow rate, and instructs the power control circuit 12 to turn off SYSVCC power, which is the power for most system components. Then, the main processor uses register 77 to toggle the flip-flop 101, which in turn enables the one-shot 96 so that a signal from lid switch 68 due to opening or closing of the lid will initiate a resume. The main processor then executes a special instruction which stops its own clock and which places it in the suspend mode, where power consumption is very low.

Figure 7:
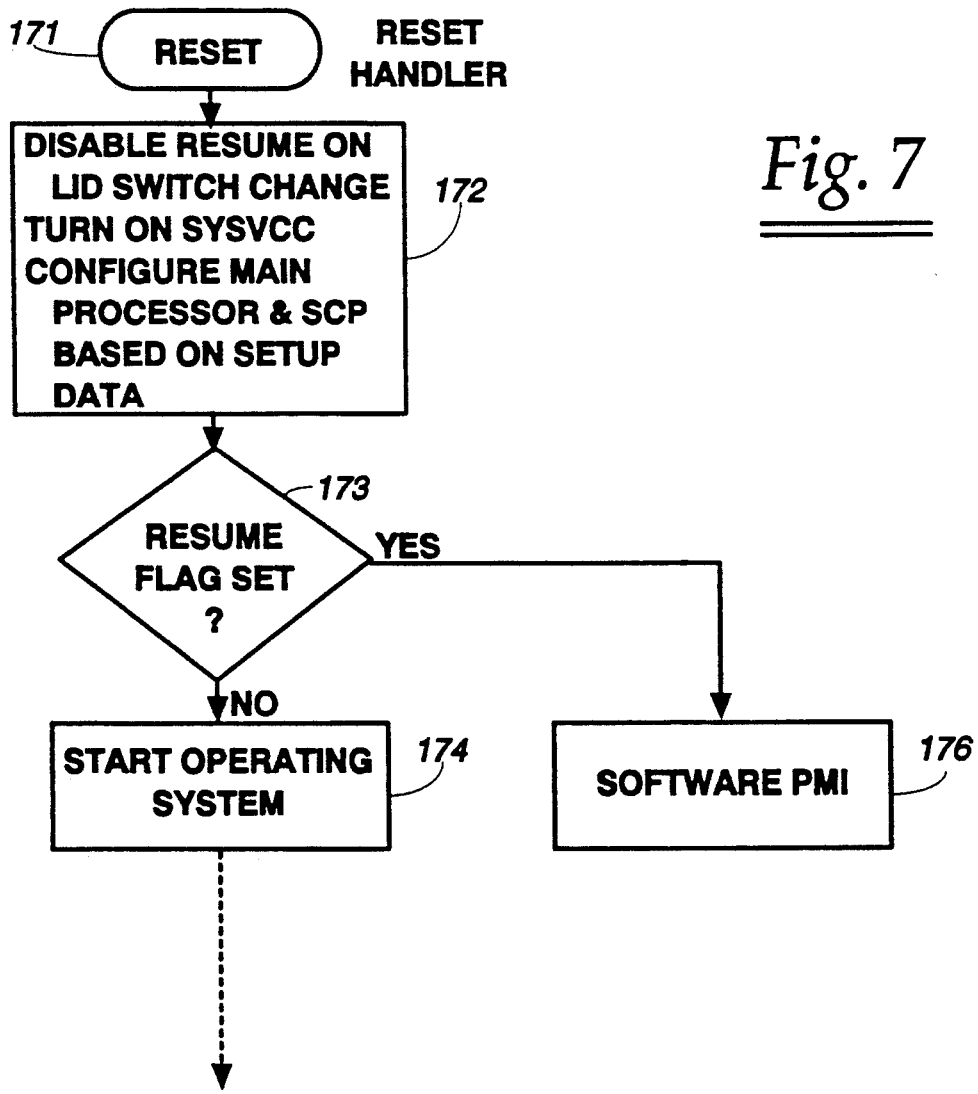

As previously mentioned, and with reference to FIG. 1, the main processor 11 exits the suspend mode when the resume control circuit 41 receives a signal on line 42 or 43 and produces a resume reset, the resume reset setting the resume flag 44. Any system reset, including the resume reset, causes the main processor 11 to execute a special reset handler routine which is stored at a predetermined location in the flash RAM 28 and which is shown in FIG. 7. Execution of this routine begins at block 171, and at block 172 the main processor uses the register 77 to toggle the flip flop 101 and thus disable the one-shot 96 so that, if the lid is opened or closed during normal operation, a further reset does not occur. The main processor then causes the power control circuit 12 to turn on SYSVCC power, and then configures itself and the SCP for normal operation based on set-up data specified by the user in a conventional manner. Then, at block 173, the processor checks the resume flag 44 in order to see whether it is set. If it is not set, then the reset was a regular reset rather than a resume reset, and at block 174 the processor starts the resident operating system. On the other hand, if the resume flag 44 is set to indicate that a resume reset occurred, then at block 176 the processor uses software to produce a PMI interrupt in order to force entry to the PMI handler routine of FIG. 4. In FIG. 4, the resume flag is again checked at 147 and will be found to be set, so that control proceeds to block 148 where a branch is made to the resume handler routine.

Figure 8:
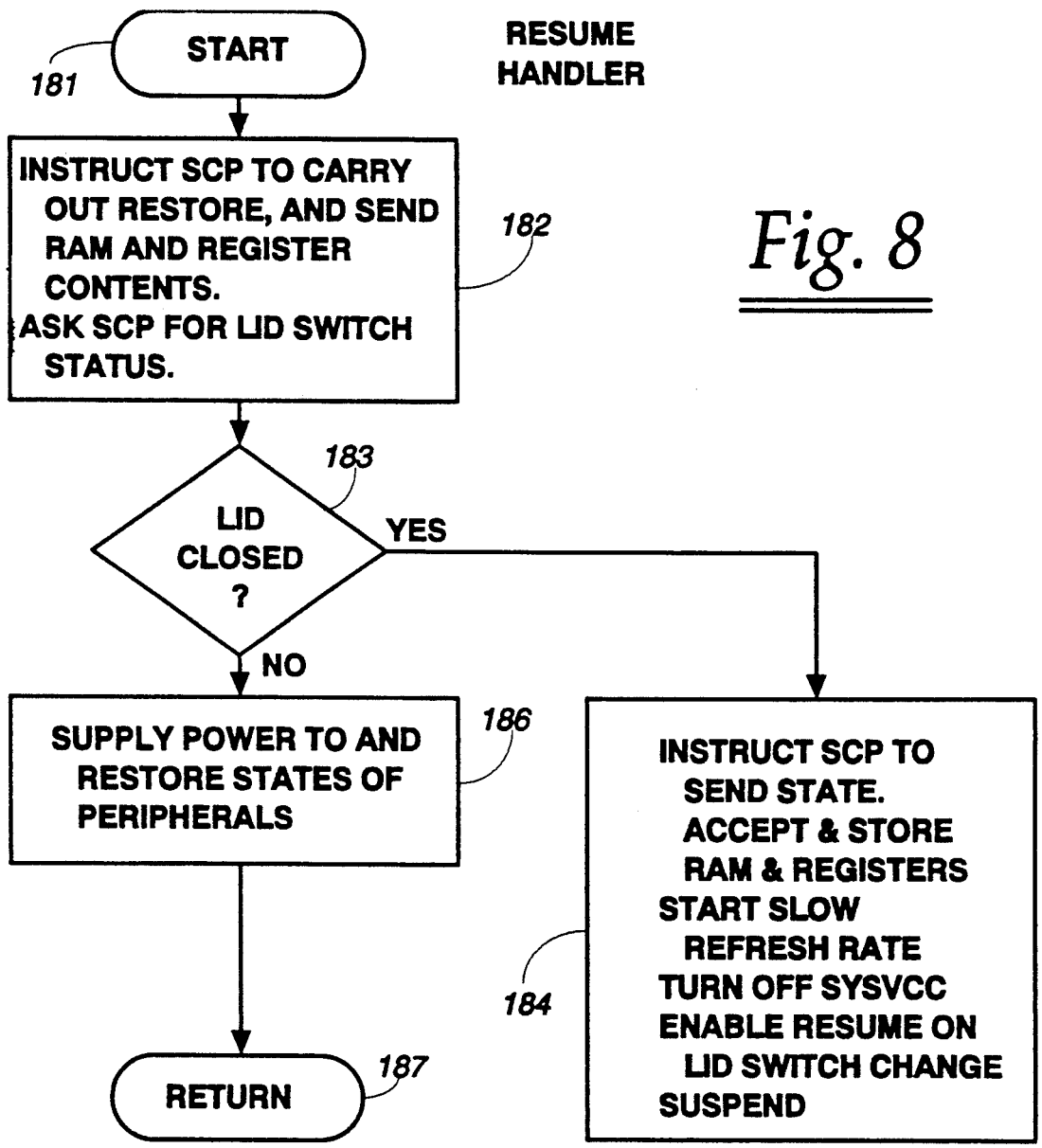

The resume handler routine is shown in FIG. 8. Execution of the resume handler routine begins at block 181, and at block 182 the main processor sends a command to the SCP indicating that the state of the SCP is to be restored, and then sends to the SCP the contents of the SCP RAM and registers which were previously stored at block 169 of FIG. 6. Then, the main processor instructs the SCP to check the state of the lid switch 68 and advise the main processor 11 of the state of the switch. Based on the information from the SCP, the main processor determines at block 183 whether the lid is closed. If it is found that the lid is closed, then the system is to be returned to suspend mode, and so at block 184 the system carries out steps similar to those shown at block 169 in FIG. 6 in order to return the system to suspend mode.

On the other hand, if the lid is open, then the main processor 11 proceeds from block 183 to block 186 and continues with the process of resuming from suspend mode, in particular by supplying power to and restoring the state of the various peripheral devices of the system. Then, at block 187, the processor executes a return, which effectively returns control to the point at which the suspend handler was called when the system was originally suspended, for example one of the blocks 160 or 166 in FIG. 5. Control then proceeds from that point, and will ultimately return to blocks 153 and 154 of FIG. 4, where the state of the processor will be restored so that the interrupted application program resumes operation from the point at which it was interrupted and as if it had not been interrupted.

OPERATION

The operation of the system in a typical situation will now be briefly described. Assume that the system is up and running and is executing an application program, and that the user has specified that closing of the lid is to place the system in suspend mode. If, while using the system, the user closes the lid, the main loop of the SCP program (FIG. 2) will determine at block 111 that the lid is now closed, will determine at block 121 that system operation is to be suspended, and at block 122 will initiate an external PMI interrupt to serve as a request to the main processor that the suspend mode be entered. This interrupt will cause the application program to be interrupted and the PMI handler routine of FIG. 4 to be entered, and control will proceed through block 151 of FIG. 4 to block 152, where the external PMI handler routine of FIG. 5 is called.

In FIG. 5, it will be determined at block 158 that the PMI was generated because the lid closed. Control will therefore proceed to block 159, where for purposes of this discussion it is assumed that the processor finds that the hard disk drive is busy and proceeds to block 161, where it sends to the SCP a command instructing the SCP to actuate its ENABLE output. The SCP services this command at blocks 139 and 140 of FIG. 3, and actuating the ENABLE output has the effect of enabling one input of AND gate 72. Meanwhile, the main processor exits the interrupt handler via blocks 162, 167, 153 and 154, and continues with execution of the interrupted application program.

When the hard disk drive 23 finishes what it is doing, it deactuates its LED output, which causes the AND gate 72 to produce an output signal indicating that the hard drive is not busy (HDNB), which passes through the OR gate 73 and causes the PMI generator 36 to generate a further PMI interrupt, which causes another entry to the routine of FIG. 4 and a call at block 152 to the routine of FIG. 5. In FIG. 5, it will be determined at block 158 that the lid did not just close, and so blocks 159–161 will be skipped. At block 162, the main processor will recognize from the PMI byte that the SCP generated the PMI because the hard disk drive is no longer busy, and thus the suspend mode (which was not entered at blocks 159–160) can now be entered. Therefore, the main processor will proceed through block 163 to block 166, where the suspend handler of FIG. 6 is called.

The suspend handler of FIG. 6 has already been described, and concludes by placing the main processor 11 in a low power mode in which its clock is turned off and program execution is halted. The processor remains in this mode until an event occurs which is intended to cause it to resume operation. In particular, if the lid is opened, the lid switch 68 will, through the signal processing circuit 13, cause the resume control circuit 41 to produce a resume reset, which in turn causes the processor 11 to begin executing the reset handler routine of FIG. 7. The processor will proceed through blocks 172 and 173 to block 176, where it generates a software PMI to effect reentry to the PMI handler routine of FIG. 4. It will be determined at block 147 that the resume flag 44 (FIG. 1) is set, and so at block 148 the processor will branch to the resume handler of FIG. 8. In the resume handler of FIG. 8, execution will proceed through blocks 182, 183 and 186, and the return at 187 will return control to block 166 in FIG. 5, where execution will proceed to block 167 for a return to block 152 in FIG. 4, after which an exit from the PMI handler routine is made through blocks 153 and 154. Execution of the interrupted application program thus continues from the point at which it was interrupted.

In the foregoing example, the system exited suspend mode in response to a resume reset produced by opening the lid. Events other than opening the lid can also produce a resume reset. For example, if the system is in the suspend mode and the modem 22 receives an incoming telephone call, the modem ring indicator signal MDMRI on line 43 will cause the resume control circuit 41 to produce a resume reset. This resume reset will be handled in precisely the same manner as described in the foregoing example, except that when block 183 in FIG. 8 is reached, the system will find that the lid is still closed. Therefore, control will proceed to block 184, where the main processor 11 will return to the suspend mode in order to wait for another resume reset caused by subsequent opening of the lid.

Also, there are events other than closing of the lid which can place the system into the suspend mode. For example, manual actuation of the switch 16 can place the system in suspend mode, while the lid remains in an open position. If the lid is then closed while the system is in suspend mode, the signal from the lid switch 68 will cause the signal processing circuit 13 to produce a pulse on line 42, which in turn will cause the resume control circuit 41 to produce a resume reset. In general, this resume reset will be handled in the manner described in the preceding paragraph for the modem ring. At block 183, it will be determined that the lid is now closed, and therefore the resume sequence will be terminated and at block 184 the system will return to the suspend mode in order to wait for a further resume reset caused by subsequent raising of the lid.

Although a particular preferred embodiment of the invention has been described in detail for illustrative purposes, it will be recognized that there are variations and modifications of the disclosed embodiment which lie within the scope of the present invention.

The embodiments of the invention in which an exclusive property or privilege is claimed are defined as follows:

1. An apparatus comprising: a computer system which includes a housing, a lid supported on said housing for movement between open and closed positions, a processor provided in said housing and having a first operational mode in which said processor executes instructions and a second operational mode in which said processor is halted in a reduced power state from which said processor can automatically exit in response to a predetermined condition, first means responsive to movement of said lid to said closed position when said processor is in said first operational mode for switching said processor to said second operational mode, and second means responsive to movement of said lid away from said closed position for switching said processor from said second operational mode to said first operational mode, said processor thereafter continuing in said first operated mode from a point at which said first operational mode was discontinued for said switching to said second operational mode; wherein said first means further responses to movement of said lid to said closed position by enabling said second means to respond to movement of said lid, and said second means responds to movement of said lid away from said closed position by disabling said second means from responding to movement of said lid.

2. An apparatus comprising: a computer system which includes a housing; a lid supported on said housing or movement between open and closed positions, a processor provided in said housing and having a first operational mode in which said processor executes instructions and a second operational mode in which said processor is halted in a reduced power state from which said processor can automatically exit in response to a predetermined condition; means responsive to movement of said lid to said closed position when said processor is in said first operational mode for switching said processor to said second operational mode; means responsive to movement of said lid away from said closed position for switching said processor from said second operational mode to said first operational mode, said processor thereafter continuing in said first operational mode from a point at which said first operational mode was discontinued for said switching to said second operational mode; wherein said means for switching said processor from said second operational mode to said first operational mode includes switch means or producing a signal having first and second states respectively indicating that said lid is in said open and closed positions, said signal being applied to one input of an exclusive OR gate, and delay means for applying to a second input of said exclusive OR gate an inverted and delayed version of said signal, said exclusive OR gate having an output connected to a trigger input of a monostable multivibrator, and said monostable multivibrator having an output which is coupled to an input of said processor, said processor being responsive to an output signal from said monostable multivibrator for effecting said switching from said second operational mode to said first operational mode.

3. An apparatus of claim 2, wherein said switch means includes a switch coupled to said lid and having an output, a first resistor connected between said output of said switch and a source of power, a first capacitor coupled between said output of said switch and ground, and a first inverter having an input coupled to said output of said switch and having an output, said output of said first inverter being said signal having said first and second states, and wherein said delay means includes a second resistor having first and second ends respectively connected to said output of said first inverter and an input of a second inverter, a third resistor having first and second ends respectively connected to an output of said second inverter and said second input of said exclusive OR gate, and a second capacitor connected between said second input of said exclusive OR gate and ground.

4. An apparatus of claim 3, including a flip-flop having a clock input and arranged to alternate between first and second states in response to the application of successive clock pulses thereto, and having an output coupled to a reset input of said monostable multivibrator, and including means for permitting said processor to selectively apply clock pulses to said clock input of said flip-flop in order to selectively enable and disable said monostable multivibrator.

5. An apparatus comprising: a computer system which includes a housing, a lid supported on said housing for movement between open and closed positions, a main processor provided in said housing and having a first operational mode in which said main processor executes instructions and a second operational mode in which said main processor is halted in a reduced power state from which said main processor can automatically exit in response to a predetermined condition, and means responsive to movement of said lid to said closed position when said main processor is in said first operational mode for switching said main processor to said second operational mode, wherein said means responsive to movement of said lid includes a further processor which is responsive to the position of said lid and which notifies said main processor when said lid is moved to said closed position.

6. An apparatus of claim 5, including means responsive to movement of said lid away from said closed position for switching said main processor from said second operational mode to said first operational mode, said main processor thereafter continuing in said first operational mode from a point at which said first operational mode was discontinued for said switching to said second operational mode.

7. An apparatus of claim 6, including means responsive to a condition other than the position of said lid for initiating a switch rom said second operational mode to said firs operational mode, and further means responsive to said lid being in said closed position for terminating a switch from said second operational mode to said first operational mode and for returning said main processor to said second operational mode.

8. An apparatus of claim 6, wherein said computer system includes a plurality of peripherals operationally coupled to said processor, and means for permitting said main processor to selectively switch each said peripheral between a normal operational state and a reduced power step, wherein as said main processor is switched from said first operational mode to said second operational mode said min processor saves an internal state of each said peripheral and switches each said peripheral from said normal operational state to said reduced power state, and wherein said main processor is switched from said second operational mode to said first operational mode said main processor switches each said peripheral from said reduced power steate to said normal operational state and restores to said peripherals said saved internal stares thereof.

9. An apparatus of claim 6, wherein said first operational mode includes an unprotected mode in which said main processor has a predetermined set of operational capabilities and a protected operational mode in which said main processor can perform a first subset of said operational capabilities and is inhibited from performing a second subset of said operational capabilities different from said first subset, means responsive to closing of said lid for forcing said main processor to said unprotected mode and for causing said main processor to execute a predetermined program which effects said switching of said main processor to said second operational mode, and including means responsive to opening of said lid for shifting said main processor from said second operational mode to said unprotected mode and or causing said main processor to then execute a program which concludes by instructing said main processor to operate in one of said protected mode and said unprotected mode in which said main processor was operating at the time the lid was closed.

10. An apparatus of claim 6, wherein said means responsive to movement of said lid to said closed position includes means for causing said main processor to save state information from said further processor and to thereafter place said further processor in a reduced power mode in which said further processor is halted; and wherein said means responsive to movement of said lid away from said closed position includes means for restoring said further processor to a normal operational mode and for the after restoring stow said further processor said state information saved therefrom.

11. An apparatus of claim 10, wherein said means responsive to movement of said lid away from said closed position is responsive to a further condition for switching said processor to said first operational mode, and includes means responsive to restoration to said further processor of said state information for requesting that said further processor indicate whether said lid is presently in said closed position and then, if said further processor indicates said lid is closed, for obtaining and storing state information from said further processor, placing said further processor back in said reduced power mode and then switching said main processor back to said second operational mode.

12. An apparatus of claim 5, wherein said computer system includes a keyboard supported on said housing and a display supported on said lid, said keyboard and display being exposed when said lid is in said open position and being covered when said lid is in said closed position.

13. An apparatus comprising: a computer system which includes a housing, a lid supported on said housing for movement between open and closed positions, a processor having a first operational mode in which said processor executes instructions and a second operational mode in which said processor is halted in a reduced power state from which said processor can automatically exit in response to a predetermined condition, means for permitting an operator to select one of first and second events to occur when said lid is moved to said closed position, said first event being switching of said processor from said first operational mode to said second operational mode.

14. An apparatus of claim 13, wherein said computer system includes a display which is exposed and hidden when said lid is respectively open and closed, and including a backlight for illuminating said display, said second event being turning off of said back light.

15. An apparatus of claim 13, wherein said computer system includes means for generating an audible sound, said second event being generation of said audible sound.

* * * * *

UNITED STATES PATENT AND TRADEMARK OFFICE
CERTIFICATE OF CORRECTION

PATENT NO. : 5,303,171
DATED : April 12, 1994
INVENTOR(S) : Steven L. BELT et al It is certified that error appears in the above-identified patent and that said Letters Patent is hereby corrected as shown below:

```
Column 12, line  4; change "responses" to
                           ---responds---.
Column 13, line 30; change "rom" to ---from---.
Column 13, line 31; change "firs" to ---first---.
Column 13, line 41; change "step" to ---state---.
Column 13, line 43; change "min" to ---main---.
Column 13, line 49; change "steate" to ---state---.
Column 13, line 51; change "stares" to ---states---.
Column 14, line  5; change "or" to ---for---.
Column 14, line 19; change "the after" to
                           ---thereafter---.
Column 14, line 19; change "stow" to ---to---.
```

Signed and Sealed this

Ninth Day of August, 1994

Attest:

BRUCE LEHMAN

Attesting Officer

Commissioner of Patents and Trademarks